(12) United States Patent
Benson

(10) Patent No.: US 6,948,868 B2
(45) Date of Patent: Sep. 27, 2005

(54) KEYBOARD STRUCTURE

(76) Inventor: Sherrie L. Benson, 4330 Carlow Way, Redding, CA (US) 96001

( * ) Notice: Subject to any disclaimer, the term of this patent is extended or adjusted under 35 U.S.C. 154(b) by 0 days.

(21) Appl. No.: 10/732,411

(22) Filed: Dec. 11, 2003

(65) Prior Publication Data

US 2005/0129447 A1    Jun. 16, 2005

(51) Int. Cl.[7] .............................. B41F 5/08; B41F 5/10; B41F 5/12
(52) U.S. Cl. ..................... 400/482; 400/91; 400/475
(58) Field of Search ............................ 400/476, 715, 400/485, 489–492, 91, 272, 472, 475, 482; G06F 3/02

(56) References Cited

U.S. PATENT DOCUMENTS

| | | |
|---|---|---|
| 323,286 A | 7/1885 | Anderson |
| 335,171 A | 2/1886 | Anderson |
| 581,570 A | 4/1897 | Anderson |
| 1,336,151 A * | 4/1920 | O'Connor ................... 400/475 |
| 2,189,023 A | 2/1940 | Ayres |
| 3,332,527 A | 7/1967 | Place |
| 4,201,489 A * | 5/1980 | Zapp .......................... 400/485 |
| 4,655,621 A | 4/1987 | Holden |
| 4,765,764 A | 8/1988 | Lefler |
| 4,804,279 A | 2/1989 | Berkelams et al. |
| 5,017,030 A | 5/1991 | Crews |
| 5,486,058 A | 1/1996 | Allen |
| 6,084,576 A | 7/2000 | Leu et al. |

\* cited by examiner

*Primary Examiner*—Andrew H. Hirshfeld
*Assistant Examiner*—Marissa Ferguson
(74) *Attorney, Agent, or Firm*—Theodore J. Bielen, Jr.

(57) ABSTRACT

A word transcription keyboard utilizing at least one keypad which is available for access by a finger of the user. A second keypad accessible to the finger of the user is extended and terminated in a press pad for allowing contact of the palm region of the hand simultaneously with the pressing of the at least one finger accessible keypad.

14 Claims, 3 Drawing Sheets

KEYBOARD STRUCTURE

BACKGROUND OF THE INVENTION

The present invention concerns a novel stenographic keyboard.

Conventional stenographic keyboards, although efficient beyond the predecessor "by-hand" systems of pen-writing, still restrict the speed of the user, as they necessitate multiple strokes to form multi-syllabic words or to add word endings.

With the standard stenographic keyboard layout, the speed required of the user, for instance, in a courtroom setting, is unnecessarily taxing on the joints of the fingers and thumbs.

In addition, the standard keyboard layout is not conducive to writing words ending in vowels, nor does it facilitate writing word endings such as "as, es, os, is, us, ad, ed, od, id, ud" at the same time and in the same stroke used to write the rest of the word.

Many keyboards have been devised to aid in the transcription of words from an oral source into a written document. For example, U.S. Pat. No. 4,765,764 describes a keyboard which includes horizontal and vertical groupings of keys to characterize consonant and vowel letters appropriately.

U.S. Pat. No. 3,332,527 shows a keyboard which employs a palm-pressed key to produce documents in Braille.

U.S. Pat. Nos. 4,804,279, 5,017,030, and 6,084,576 describe keyboards which are unconventional in arrangement to more easily access familiar keys in the construction of words.

U.S. Pat. Nos. 323,286, 335,171, 581,570, 2,189,023, 4,655,621, and 5,486,058 describe keyboards which are used to transcribe words having palm pressed keys that have been added and are separately operable from the existing keys on a stenographic keyboard. The palm keys are pressed simultaneously with the individual finger operated keys in many cases.

A word transcription keyboard which is capable of quickly and easily transcribing words from an oral source with employment of the entire hand of the user would be a notable advance in the field of language transcription.

BRIEF SUMMARY OF THE INVENTION

In accordance with the present invention a novel and useful word transcription keyboard is herein provided.

The keyboard structure of the present invention utilizes at least a first keypad accessible to a first finger of the user. The first keypad may be linked for depression by a recording system of one hand of conventional configuration, via mechanical, electronic, wireless, and like pathways. The first keypad may be arranged on a keyboard in a pattern or array which may closely follow a stenographic shorthand machine keyboard. Likewise, at least a second keypad is accessible to a second finger of one hand of the user. Again, the second keypad may lie in a pattern or array typical of a conventional stenographer's keyboard.

At least one press pad is found in the present invention. The press pad is intended to be contacted and actuated by the palm region of the one hand of the user. A linkage connects the press pad to the first finger-depressed keypad and extends outwardly therefrom. The press pad is positioned in a convenient orientation to allow the user to actuate the press pad by the palm region of the one hand of the user and simultaneously press the second keypad or other keypads by the fingers of the same hand. The linkage may comprise an arm which extends beneath the upper surfaces of the press pad and the first keypad. In certain cases, the linkage between the press pad and the first keypad may be electrical or wireless.

Moreover, the keyboard of the present invention may include additional finger depressed keypads and press pads linked to those finger depressed keypads. In certain cases, a particular press pad may not only be available for activation simultaneously with finger depressed keypads, but may be capable of changing the identification of the remaining finger depressed keypads. Certain palm-depressed press pads may be angulated to ease the simultaneous depression of keypads and press pads.

It may be apparent that a novel and useful word transcription keyboard has been hereinabove described.

It is therefore an object of the present invention to provide a word transcription keyboard which includes finger actuated keypads and press pads which may be activated by the palm region of the hand to provide word transcription signals.

Another object of the present invention is to provide a word transcription keyboard in which finger actuated keys and press pads actuated by the palm region of the hand which may be depressed simultaneously to produce a composite signal representative of portions or components of a word.

Another object of the present invention is to provide a word transcription keyboard in which a user may transcribe spoken words in multiple languages.

Yet another object of the present invention is to provide a word transcription keyboard which is capable of reducing the number of strokes necessary to transcribe a word in comparison to stenographic shorthand keyboards of the prior art.

Another object of the present invention is to provide a stenographic shorthand keyboard which is easily manipulated by persons having physical disabilities.

Another object of the present invention is to provide a stenographic shorthand keyboard which utilizes a uniform method of transcribing words to fit multiple language patterns and cadences.

Another object of the present invention is to provide a stenographic shorthand keyboard which employs the entire hand of the user to write words, in order to reduce the actual labor and stress involved.

Another object of the present invention is to provide a stenographic shorthand keyboard which is capable of transcribing words at a markedly faster rate than a conventional stenographer's keyboard, thus, permitting accurate transcription of words emanating from a high rate source, such as a rapidly speaking attorney.

The invention possesses other objects and advantages especially as concerns particular characteristics and features thereof which will become apparent as the specification continues.

For a better understanding of the invention reference is made to the following detailed description of the preferred embodiments thereof which should be referenced to the hereinabove described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

Figure 1:
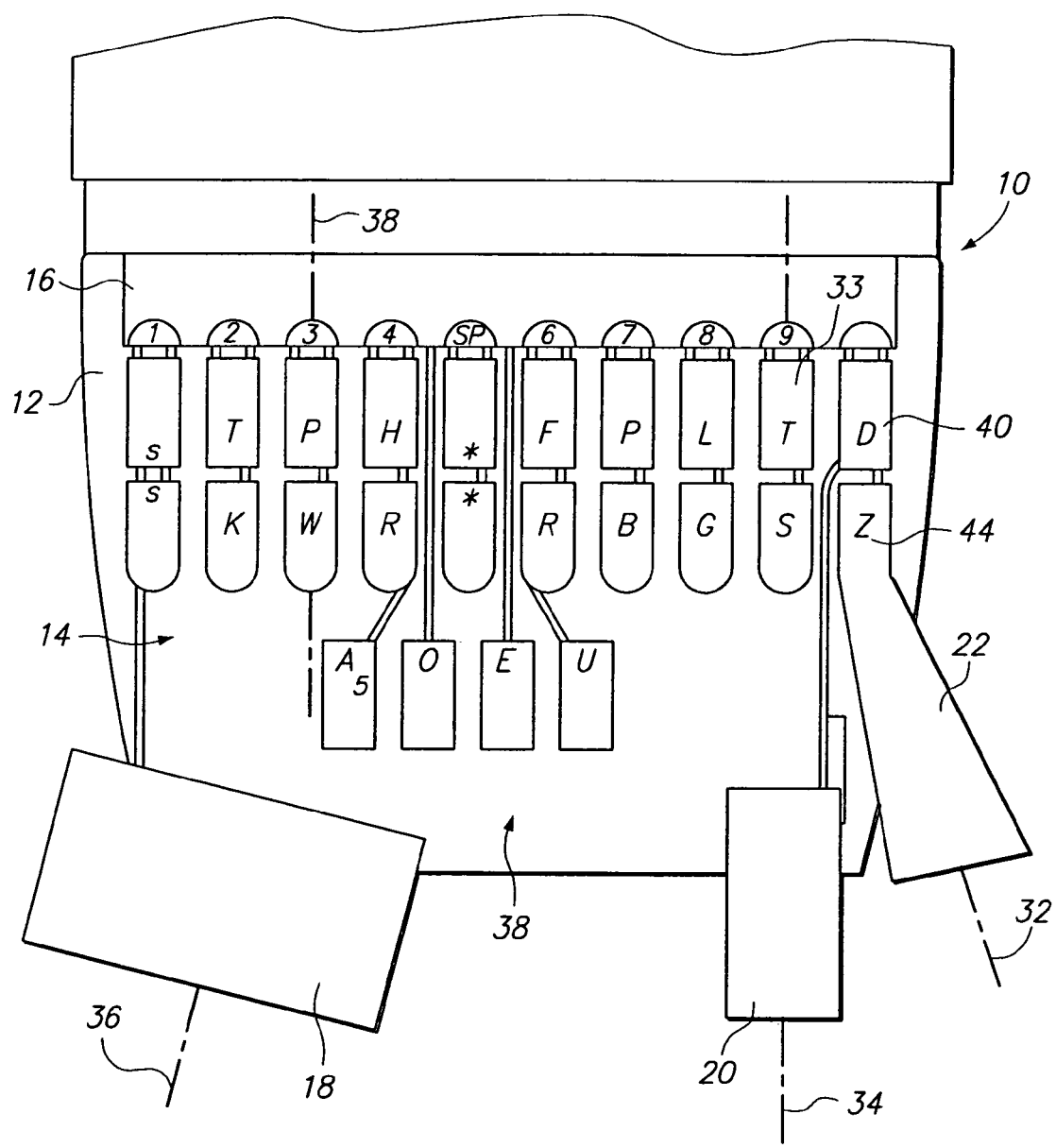
FIG. 1 is a top plan view of the keyboard of the present invention with the signal receiving portion of a stenographer machine depicted partially.

The invention as a whole is shown in the drawings by reference character 10, FIG. 1. Keyboard 10 includes a chasis or module 12 of conventional configuration. Module 12 contains a known mechanism (not shown) for transmitting key strokes on a stenographic keyboard into usable data storage media such as a tape, an electronic record, and the like, which is used for later or simultaneous transcription into readable text. Keyboard 12 possesses a plurality of conventional keys 14 which are normally pressed by the fingers of the user, specifically the finger tips. For example, such keys are lettered "T", "P", and "H" and the like on FIG. 1. Number bar 16 extends across keyboard 10. Of notable interest in the preferred embodiment of the present invention are keys labeled as "D" and "Z", which will be discussed in detail hereinafter.

Figure 4:
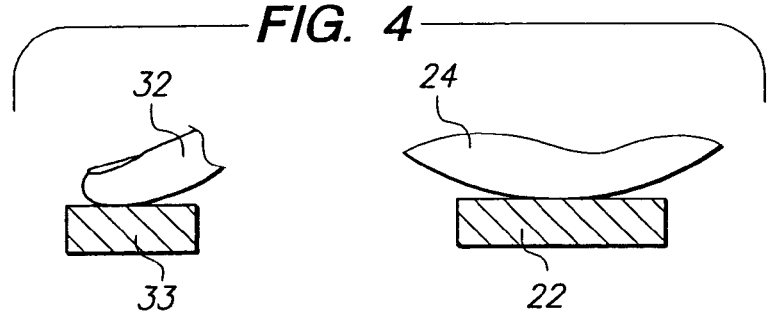
FIG. 4 is a schematic sectional view depicting the simultaneous pressing of finger pads and palm pads on the keyboard depicted in FIG. 1.
Figure 5:
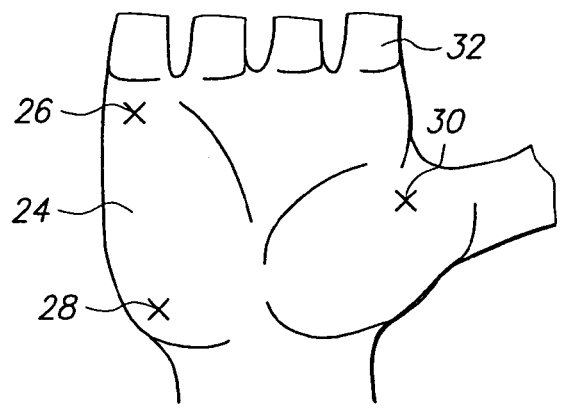
FIG. 5 is a schematic of the palm portion of a hand with Xs indicating palm pressure points used with the palm actuated press pads of the keyboard depicted in FIG. 1.

The present invention is also constructed with press pads 18 that are intended to be contacted and depressed by the palm portion of the hands. For example, FIG. 5 illustrates, schematically, a palm portion of the right hand of a human 24. The X-ed regions 23, 24, 25, 26, 27, 28, 29, 30, and 32 indicate the portions of the palm region of the hand 24 which could contact any one of press pads, 18, 20, and 22. The term "palm portion" is intended to include all portions of a hand other than the finger tips of such hand. Typically, press pads 20 and 22 would be contacted by the right hand of the user while press pad 18 would be contacted by the left hand of the user. In addition, as is the case in a conventional stenographer keyboard, plurality of keys 14 and press pads may be depressed simultaneously. Specifically, with respect to the present invention, press pads 18, 20, and 22 may be depressed simultaneously with any of the keypads not linked to press pads 18, 20, and 22. For example, press pad 22 may be pressed simultaneously with keypads contacted by the finger tips of the user, such as keypads labeled "P" and "L". Of course, multiple combinations may be employed in the present invention using a plurality of conventional finger tip-pressed keypads 14 and press pads 18, 20, and 22. FIG. 4 represents the simultaneous pressing of press pads 18, 20, and 22 with any one of conventional finger tip-pressed keypads 14. Through the rendition shown in FIG. 4, finger 32 is depressing pad 33 bearing the letter "T" and palm of hand 24 is depressing press pad 22.

Again referring to FIG. 1, it should be seen that press pad 22 is angulated along axis of elongation 32. Finger tip-pressed keypads "T" and "S", as well as press pad 20, lie along axis of elongation 34. Needless to said, axis of elongation 32 is angularly and obliquely oriented relative to axis of elongation 34. Such orientation of press pad 22 eases simultaneous depression of palm-pressed pad 22 and exemplar finger tip-pressed keypads "T" or "S". A similar situation exists with respect to press pad 18 which lies along axis 36. Again, axis 36 is angularly and obliquely oriented relative to axis 38 which passes through finger tip-pressed keypads labeled "P" and "W". In addition, finger tip-pressed keypad group 38 labeled "A", "O", "E", and "U", have been elongated relative to the remaining finger tip-pressed keypads of plurality of keypads 14. Further, this structure permits the user to more easily simultaneously depress press pads 18, 20, and 22 with one or more of plurality of finger tip-pressed keypads 14.

Figure 2:
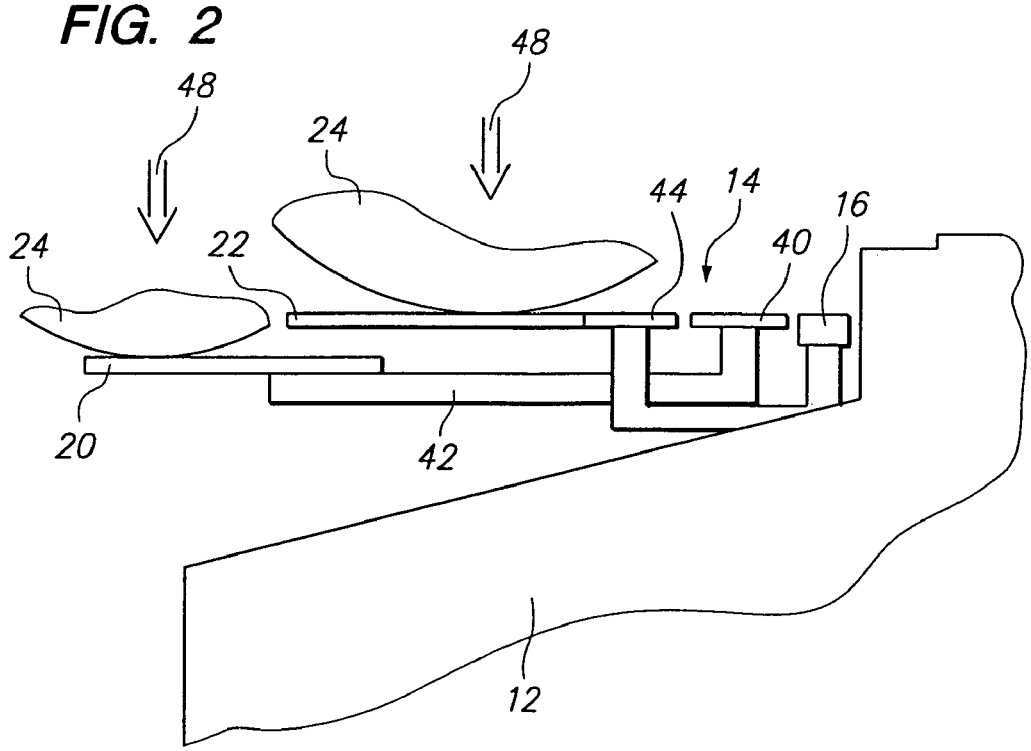
FIG. 2 is a right side elevational view of the keyboard of FIG. 1.
Figure 3:
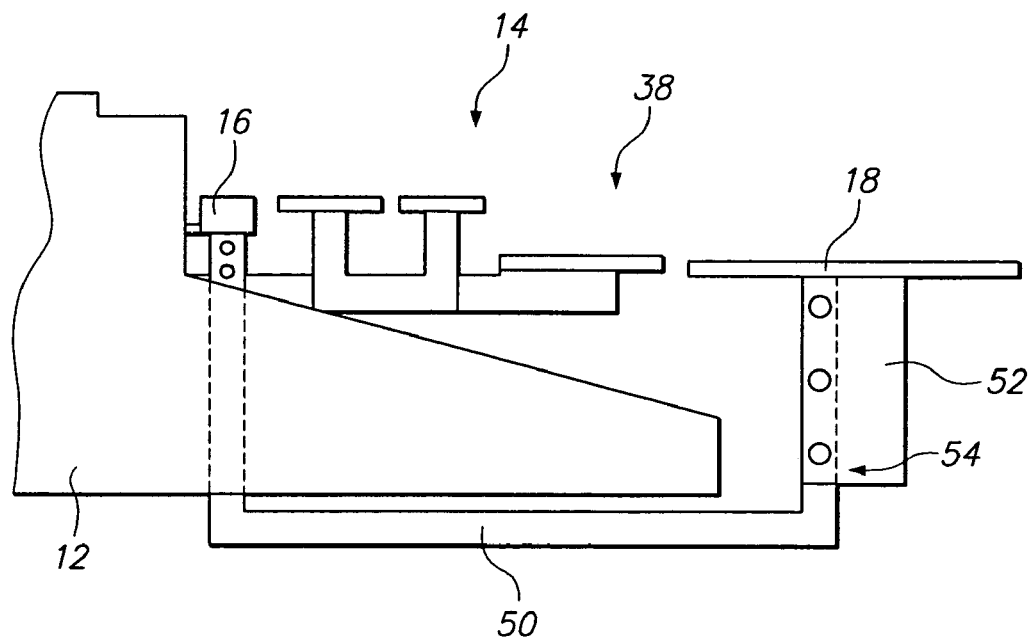
FIG. 3 is a left side elevational view of the keyboard of FIG. 1.

Turning to FIGS. 2 and 3, it may be apparent that press pads 18, 20, and 22 are connected to certain finger tip-pressed keypads. For example, finger tip-pressed keypad 40, labeled "D" includes a linkage arm 40 connected to press pad 20. Linkage arm 40 is formed integrally with or connected to keypad 40 and press pad 20 by any suitable means, such as welding, gluing, fasteners, and the like. Also, finger tip-pressed keypad 44, labeled "Z", is linked to press pad 22 by direct extension of the same through an integral structure. Directional arrows 46 and 48 indicate the pressure exerted by the palm portion of hand 24 on press pads 20 or 22. FIG. 3 represents the linkage of press pad 18 to number bar 16 through L-shaped linkage bracket 50. Wing 52 and plurality of rivets 54 secure the connection between press pad 18 and finger tip-pressed number pad 16.

Figure 6:
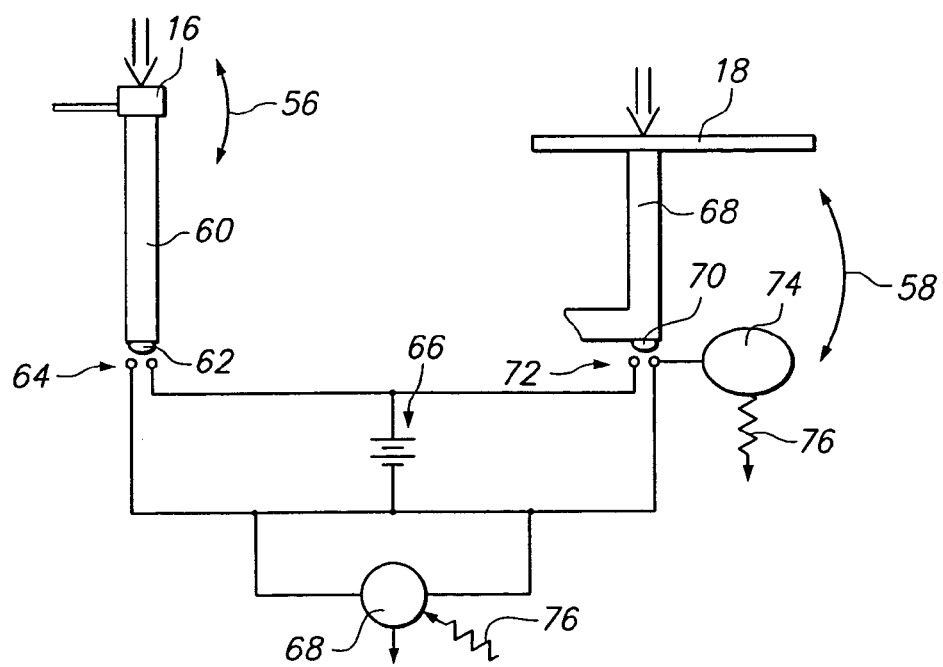
FIG. 6 is a schematic view of an alternate method of conveying signals from a typical press pad found in FIG. 1.

Referring now to FIG. 6, a schematic rendition of a finger tip-pressed key or bar 16 and a palm pressed pad 18 is depicted wherein signal is transmitted by non-mechanical arrangements. For example, either finger tip-pressed key 16 or palm actuated press pad 18 is rotated downwardly, directional arrows 56 and 58. Extension 60 of finger tip-pressed key 16 includes a contact 62 which simultaneously, mechanically, and electrically contact pair of contacts 64. Such bridging of pair of contact 64 allows electrical source 66 to generate a signal to signal storage processing means 68, of conventional configuration. Likewise, arm 68 associated with pad 18 includes a contact 70 which interconnects pair of contacts 72. Exemplar RF generator 74 may be employed as an alternative to the electrical system hereinabove described to send a wireless signal 76 to storage processing means 68. Of course, a wireless signal generator, similar to generator 74, may be employed in conjunction with pair of contacts 64 activated by the finger tip-pressing of key 16.

In operation, the user operates keyboard 10 by simultaneously depressing any of the press pad 18, 20, and 22 by the palm portion of hand 24 alone or in combination with any one or a combination of finger tip-pressed key pads 14 to create a signal representing a word or portions of words in any spoken language. Such signals are processed in the usual manner to systems known in stenographic keyboards into a recorded media such as a tape, electronic storage item, and the like, for eventual transcription into written a document.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A word transcription keyboard for use with a user's fingers and palm region of one hand of a user, comprising:

a. first keypad accessible to a finger of the one hand of the user;
b. second keypad accessible to a finger of the one hand of the user;
c. a linkage for extending said first keypad outwardly therefrom; and
d. a press pad, said press pad connected to said linkage for extending said first keypad outwardly therefrom, and located for contact by the palm region of the one hand of the user to permit the simultaneously contact of said second keypad by a finger of one hand of the user to operate the same and contact of said press pad by the palm region of the one hand of the user to operate said first keypad, wherein said simultaneous contact provides an output different from the output resulting from depression of either said press pad or said second keypad.

2. The keyboard of claim 1 in which said linkage comprises an arm connected to said first keypad and connected to said press pad.

3. The keyboard of claim 1 in which said linkage between said second keypad and said press pad comprises a mechanical linkage.

4. The keyboard of claim 1 in which said linkage between said second keypad and said press pad comprises an electrical linkage.

5. The keyboard of claim 1 in which said press pad and said first keypad each include a contact surface positioned relative to an axis, said axis of said press pad oriented angularly relative to said axis of said press pad.

6. The keyboard of claim 5 in which said linkage comprises an arm connected to said first keypad and connected to said press pad.

7. The keyboard of claim 5 in which said linkage between said second keypad and said press pad comprises a mechanical linkage.

8. The keyboard of claim 5 in which said linkage between said second keypad and said press pad comprises an electrical linkage.

9. The keyboard of claim 5 which further includes at least one special keypad accessible to a finger of the user said special keypad being enlarged relative to said first keypad.

10. The keyboard of claim 5 in which said linkage between said second keypad and said press pad comprises a wireless linkage.

11. The keyboard of claim 5 in which said press pad comprises a first press pad and further includes a third keypad and a second press pad, said second press pad linked to said second keypad.

12. The keyboard of claim 1 which further includes at least one special keypad accessible to a finger of the user said special keypad being enlarged relative to said first keypad.

13. The keyboard of claim 1 in which said linkage between said second keypad and said press pad comprises a wireless linkage.

14. The keyboard of claim 1 in which said press pad comprises a first press pad and further includes a third keypad and a second press pad, said second press pad linked to said second keypad.

* * * * *